J. J. ROHDE.
PARKING LIGHT.
APPLICATION FILED MAR. 21, 1918.
1,383,569.
Patented July 5, 1921.
2 SHEETS—SHEET 2.
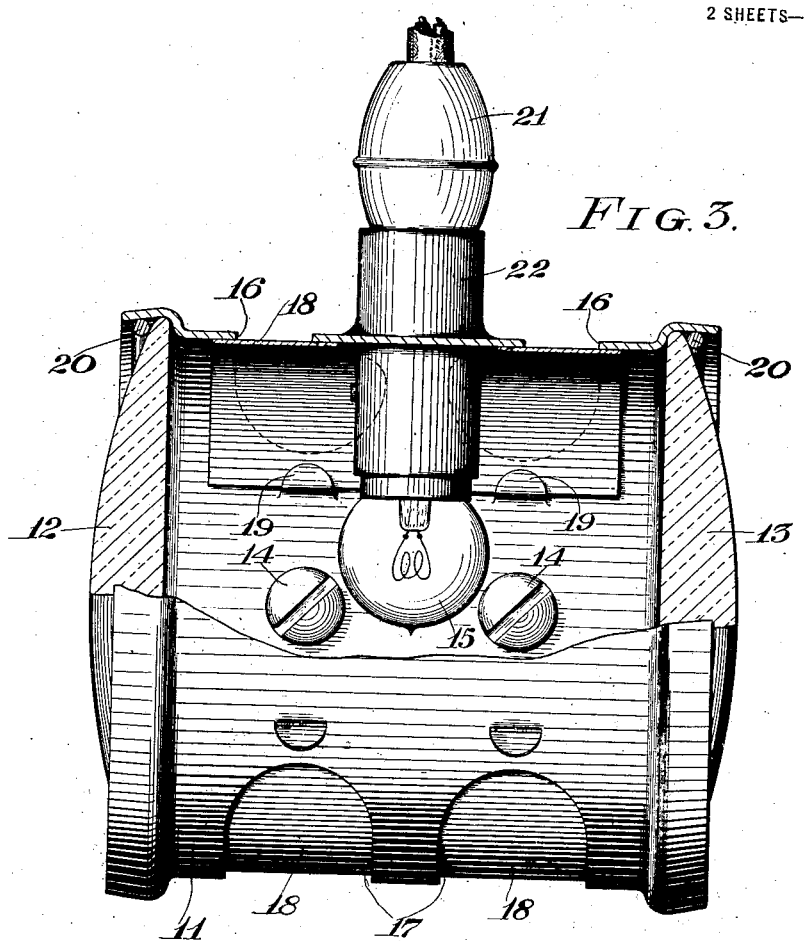
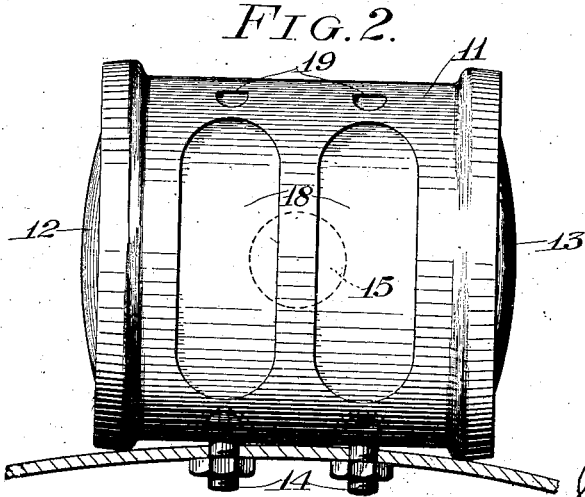
WITNESSES.
C. L. Waal
H. W. Chase
INVENTOR.
John J. Rohde
By R. S. Caldwell
ATTORNEY.

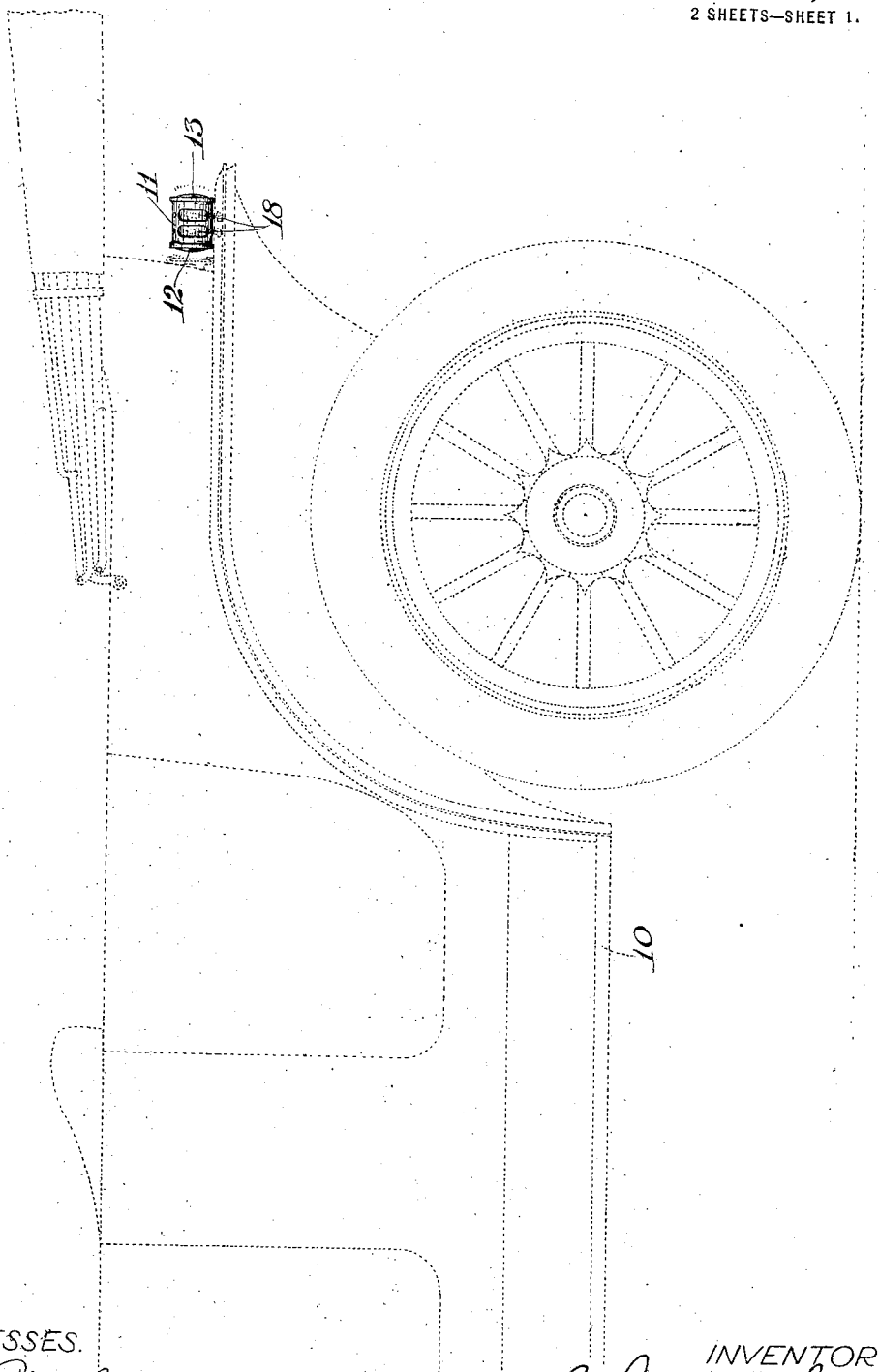

UNITED STATES PATENT OFFICE.

JOHN J. ROHDE, OF MILWAUKEE, WISCONSIN, ASSIGNOR OF ONE-HALF TO J. ELMER LEHR, OF MILWAUKEE, WISCONSIN.

PARKING-LIGHT.

1,383,569.  Specification of Letters Patent.  Patented July 5, 1921.

Application filed March 21, 1918. Serial No. 223,829.

*To all whom it may concern:*

Be it known that I, JOHN J. ROHDE, a citizen of the United States, and resident of Milwaukee, Milwaukee county, Wisconsin, have invented new and useful improvements in Parking-Lights, of which the following is a description, reference being had to the accompanying drawings, which are a part of this specification.

This invention has for its object to provide a parking light for automobiles which will serve to comply with the law requiring a white light to be shown in front and a red light to be shown at the rear of a vehicle and which will accomplish this purpose by means of a single lamp so as to economize in the consumption of electric current.

Heretofore automobiles have been commonly parked at night with the headlights and taillight burning, and though dimming resistance has been connected in series with the headlights there is still an unnecessary amount of current consumed, and the object of the present invention is to provide a substitute or parking lamp to avoid this waste and serve as both front light and rear light, and preferably located on the rear wheel fender where it can be seen from the front or the rear.

Referring to the accompanying drawings in which like characters of reference designate the same parts in different views:

Figure 1 is a view of a parking light of this invention in use on an automobile;

Fig. 2 is a side view thereof; and,

Fig. 3 is a sectional plan view thereof.

In these drawings 10 indicates in dotted lines the outline of an automobile, on the rear wheel fender of which is secured the parking light of this invention. The parking light comprises a cylindrical casing 11 having a front lens 12 at one end thereof and a rear lens 13 at the other end. The casing is preferably secured by bolts 14 to the fender or bracket or other support either on the right or the left side of the car but preferably so that the electric lamp 15 contained therein will throw a light through parallel slots 16 upon the license plate at the rear of the automobile. These slots 16 as well as similar parallel slots 17 diametrically opposite thereto are preferably covered by a clear flexible membrane such as celluloid sheets 18 and are held in place by means of ears 19 struck up from the casing. The lenses 12 and 13 are removable, being only held in place by means of spring wire rings 20 bearing against their outer edges and the converging flanges of the ends of the casing, and when one of them is removed the lamp 15 is readily accessible to permit of its being replaced when necessary. The cable plug connection 21 is made on the inner side of the casing, the socket 22 therefore constituting a continuation of the socket for the lamp 15.

An automobile equipped with the parking light of this invention may be left standing with only the parking light burning and with a corresponding saving in the amount of electrical current consumed. The front lens which may be clear or suitably colored will take the place of the ordinary headlight, while the rear light, which is desirably colored red, will take the place of the taillight. At the same time the clear light showing through the slots 17 and 16 will show at the side of the car and upon the license plate respectively so that ample illumination to comply with the law and for safety is provided by the single lighted lamp.

What I claim as new and desire to secure by Letters Patent is:

A parking light for automobiles comprising a casing, means distinct from the license bracket for connecting the casing to the automobile to be in sight from the front, rear and side thereof and adjacent the license plate and with its axis extending longitudinally of the automobile, an electric lamp within the casing, a clear glass lens for the front and a red glass lens for the rear of the casing, openings in the side of the casing to project light onto the license plate and to the side of the car, and transparent coverings for said openings whereby a white light is projected to the front and side of the vehicle and a red light to the rear of the automobile simultaneously with the illumination of the license plate.

In testimony whereof, I affix my signature, in presence of two witnesses.

JOHN J. ROHDE.

Witnesses:
R. S. C. CALDWELL,
H. D. CHASE.